United States Patent
Kawasaki et al.

(10) Patent No.: US 8,165,002 B2
(45) Date of Patent: Apr. 24, 2012

(54) OPTICAL PICKUP APPARATUS AND OBJECTIVE LENS

(75) Inventors: Ryoichi Kawasaki, Isesaki (JP); Tohru Hotta, Okaya (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 12/729,085

(22) Filed: Mar. 22, 2010

(65) Prior Publication Data

US 2010/0238781 A1    Sep. 23, 2010

(30) Foreign Application Priority Data

Mar. 23, 2009 (JP) ................................. 2009-069266
Nov. 5, 2009 (JP) ................................. 2009-254254

(51) Int. Cl.
*G11B 7/00* (2006.01)
(52) U.S. Cl. ............ 369/112.01; 369/112.23; 369/44.32
(58) Field of Classification Search ............ 369/112.23, 369/112.01
See application file for complete search history.

(56) References Cited

U.S. PATENT DOCUMENTS

| | | | |
|---|---|---|---|
| 5,818,809 A * | 10/1998 | Arai et al. ................. | 369/112.24 |
| 2005/0174918 A1* | 8/2005 | Ogata ....................... | 369/112.02 |
| 2005/0219987 A1* | 10/2005 | Hashimura et al. ...... | 369/112.08 |
| 2008/0080337 A1* | 4/2008 | Kamioka ................... | 369/44.23 |
| 2009/0161502 A1* | 6/2009 | Shiono ........................ | 369/44.22 |

FOREIGN PATENT DOCUMENTS

| | | |
|---|---|---|
| JP | 2004-014042 | 1/2004 |
| JP | 2005-338684 | 12/2005 |

* cited by examiner

*Primary Examiner* — Adam R Giesy
(74) *Attorney, Agent, or Firm* — SoCal IP Law Group LLP; Steven C. Sereboff

(57) ABSTRACT

An optical pickup apparatus comprising: a laser diode; an objective lens made of synthetic resin arranged in an optical path of laser light between the laser diode and an optical disc so that the laser light from the laser diode is focused onto a signal recording layer through a protection layer of the optical disc; and an aberration correction element interposed in an optical path of the laser light between the laser diode and the objective lens, the aberration correction element configured to be operated so as to correct spherical aberration caused by moisture-absorption characteristics of the objective lens.

14 Claims, 6 Drawing Sheets

OPTICAL PICKUP APPARATUS AND OBJECTIVE LENS

CROSS-REFERENCE TO RELATED APPLICATIONS

This application claims the benefit of priority to Japanese Patent Application Nos. 2009-69266 and 2009-254254, filed Mar. 23, 2009 and Nov. 5, 2009, respectively, of which full contents are incorporated herein by reference.

BACKGROUND OF THE INVENTION

1. Field of the Invention

The present invention relates to an optical pickup apparatus that performs operation of reading a signal recorded in an optical disc and operation of recording a signal in the optical disc by using laser light, and an objective lens used in the optical pickup apparatus.

2. Description of the Related Art

There are known an optical disc device capable of performing signal reproduction operation and signal recording operation by applying laser light emitted from an optical pickup apparatus to a signal recording layer of an optical disc is known. As such an optical disc device, a device using an optical disc called CD or DVD is widely known in general, but that using an optical disc with improved recording density, that is, a Blu-ray standard disc has been developed in these days.

Infrared light with a wavelength of 780 nm is used as laser light for performing operation of reading a signal recorded in the CD-standard optical disc, while red light with a wavelength of 650 nm is used as laser light for performing operation of reading a signal recorded in a DVD-standard optical disc.

In contrast to such CD-standard and DVD-standard optical discs, laser light with a short wavelength, such as a blue-violet light with a wavelength of 405 nm, is used as laser light for performing operation of reading a signal recorded in the Blu-ray standard optical disc.

The thickness of the protection layer is 0.1 mm which is provided on an upper face of the signal recording layer in the Blu-ray standard optical disc, and the numerical aperture of the objective lens is set at 0.85 which is used for the operation of reading a signal from this signal recording layer.

In order to reproduce a signal recorded in the signal recording layer provided in the Blu-ray standard optical disc or to record a signal in the signal recording layer, a diameter of a laser spot formed by converging the laser light is required to be reduced. Since an objective lens used for obtaining a desired laser spot shape has not only a larger numerical aperture but also a shorter focal length, a radius of curvature of the objective lens is reduced.

The optical pickup apparatus includes a laser diode for emitting laser light with a wavelength corresponding to each of the above-mentioned standards and an objective lens for converging the laser light emitted from the laser diode to the signal recording layer provided in each of the optical discs. As a material of such an objective lens, glass is used in general, but synthetic resin has been often used in order to produce inexpensive lenses, recently.

Also, a configuration is made so as to be capable of performing a control operation for focusing the spot of the laser light emitted from the optical pickup apparatus onto the signal recording layer in the optical disc, i.e., a focusing control operation or a control operation for allowing the spot of the laser light to follow a signal track, i.e., a tracking control operation.

Also, in the optical pickup apparatus, spherical aberration is caused by the thickness of a protection layer located between a disc face, which is a laser light incident face of the optical disc, and the signal recording layer, thereby resulting in such a problem that the signal reproduction operation or signal recording operation cannot be performed normally. As a method for solving this problem, such a technique has been developed that the spherical aberration is corrected by moving a collimating lens provided between the laser diode and the objective lens in an optical-axis direction (See Japanese Patent Laid-Open Publication No. 2005-338684, Japanese Patent Laid-Open No. 2004-14042).

Though a price of the optical pickup apparatus can be reduced by manufacturing an objective lens by using synthetic resin, the synthetic resin has a characteristic that its properties, particularly transmission characteristics, are changed according to the wavelength of the laser light to be used. In the case where an objective lens for converging laser light conforming to the Blu-ray standard, i.e., blue-violet laser light with a wavelength of 405 nm, is manufactured by using such a synthetic resin material that is used for an objective lens for converging laser light conforming to the DVD standard, i.e., red laser light with a wavelength of 650 nm, for example, a synthetic resin material called APL5014DP by Mitsui Chemicals Inc., such a property is exhibited that transmittance of the objective lens is reduced according to elapsed time of irradiation of the blue-violet laser light.

Such transmittance is decreased as an output of the laser light becomes greater, and thus, this is a significant problem in an optical pickup apparatus in which an output of the laser light is increased such as an optical pickup apparatus that performs the recording operation.

If the transmittance of the objective lens is reduced, the laser light converged to the signal recording layer included in the optical disc is decreased in intensity, so that the operation of reproducing a signal recorded in the optical disc or the operation of recording a signal cannot be performed normally. In order to solve such problem, a synthetic resin material affected in a less extent by the blue-violet laser light such as a resin material called ZEONEX340R by Zeon Corporation is used as a material of the objective lens, for example, however, such a material is expensive, causing a problem that the optical pickup apparatus cannot be reduced in price.

Moreover, in order to increase the radius of curvature of the objective lens (that is, to flatten the curvature) and to decrease the thickness thereof, the objective lens is required to be configured by a resin material with a high refractive index. However, since the resin material has higher moisture-absorption characteristics than a glass material, the objective lens configured by such a resin material has a problem that spherical aberration is caused by the high moisture-absorption characteristics.

SUMMARY OF THE INVENTION

An optical pickup apparatus according to an aspect of the present invention, comprises: a laser diode; an objective lens made of synthetic resin arranged in an optical path of laser light between the laser diode and an optical disc so that the laser light from the laser diode is focused onto a signal recording layer through a protection layer of the optical disc; and an aberration correction element interposed in an optical path of the laser light between the laser diode and the objective lens, the aberration correction element configured to be operated so as to correct spherical aberration caused by moisture-absorption characteristics of the objective lens.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

An optical pickup apparatus according to an embodiment of the present invention described below enables use of laser light, such as blue-violet laser light, affecting optical characteristics of an objective lens made of synthetic resin. Also, the optical pickup apparatus according to an embodiment of the present invention enables correction of spherical aberration caused by moisture-absorption characteristics of the objective lens made of synthetic resin and enables use of an objective lens employing inexpensive synthetic resin material with excellent light resistance. Therefore, an embodiment of the present invention has a great effect in reducing a price of the optical pickup apparatus. Moreover, according to an embodiment of the present invention, it is possible to reduce curvature and thickness of the objective lens while occurrence of spherical aberration thereof is suppressed.

[Embodiment 1]

Figure 1:
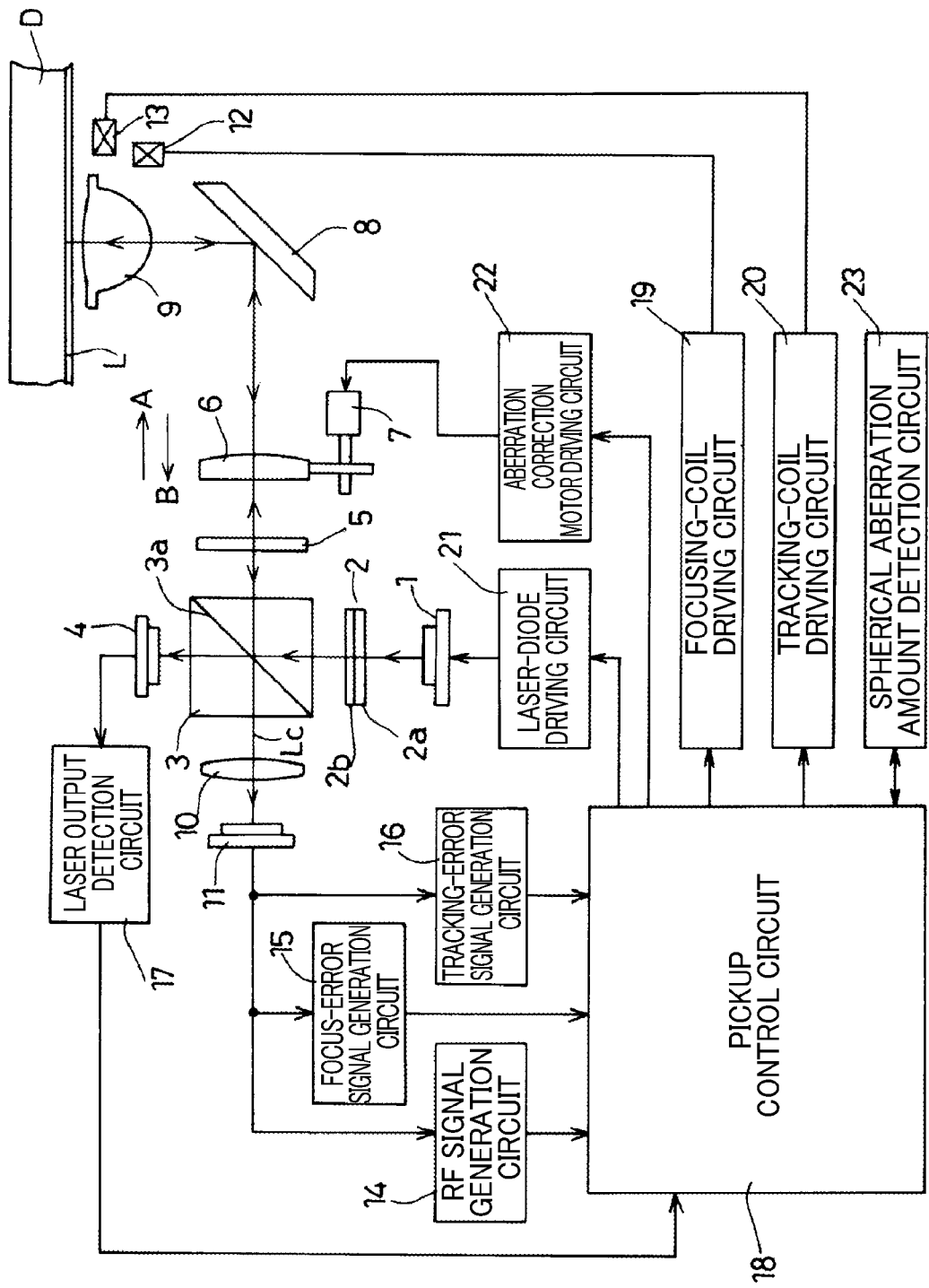
FIG. 1 is a schematic diagram illustrating an embodiment 1 of an optical pickup apparatus according to the present invention.

In FIG. 1, reference numeral 1 denotes a laser diode that emits laser light, which is blue-violet light with a wavelength of 405 nm, for example, and reference numeral 2 denotes a diffraction grating, which the laser light emitted from the laser diode 1 enters and which includes a diffraction grating portion 2a for dividing the laser light into a main beam, which is 0th order light, and two sub-beams, which are +1st order light and −1st order light and a half-wave plate 2b for converting the incident laser light into a linearly polarized light in an S direction.

Reference numeral 3 denotes a polarizing beam splitter, which is disposed at a position where the laser light having passed through the diffraction grating 2 enters, and which includes a control film 3a that reflects most of the laser light S-polarized by the half-wave plate 2b and allows all the laser light polarized in a P direction to be passed therethrough.

Reference numeral 4 denotes a monitor photodetector, which is disposed at a position where the laser light having passed through the control film 3a of the polarizing beam splitter 3 out of the laser light emitted from the laser diode 1 is applied, and whose detection output is used for controlling an output of the laser light emitted from the laser diode 1.

Reference numeral 5 denotes a quarter-wave plate, which is disposed at a position where the laser light reflected by the control film 3a of the polarizing beam splitter 3 is incident and which has a function of converting the incident laser light from linearly polarized light into circular polarizing light or, to the contrary, from the circular polarizing light to the linearly polarized light. Reference numeral 6 denotes a collimating lens, which the laser light having passed through the quarter-wave plate 5 enters to be converted into parallel light, and which is configured to be displaced by an aberration correction motor 7 in an optical axis direction, that is, in arrow A and B directions. It is configured such that spherical aberration caused by thickness of a protection layer of an optical disc D and moisture-absorption characteristics of the objective lens, which will be described later, is corrected by displacement operation of the collimating lens 6 in the optical axis direction.

Reference numeral 8 denotes a raising mirror disposed at a position, on which the laser light having passed through the collimating lens 6 is incident and which is configured to reflect the incident laser light in a direction of the objective lens 9.

In such a configuration, the laser light emitted from the laser diode 1 enters the objective lens 9 through the diffraction grating 2, the polarizing beam splitter 3, the quarter-wave plate 5, the collimating lens 6, and the raising mirror 8, to be applied as a spot to a signal recording layer L included in the optical disc D by a focusing operation of the objective lens 9, and then, the laser light applied to the signal recording layer L is reflected by the signal recording layer L as return light.

The return light reflected from the signal recording layer L of the optical disc D enters the reflective film 3a of the polarizing beam splitter 3 through the objective lens 9, the raising mirror 8, the collimating lens 6, and the quarter-wave plate 5. The return light incident onto the reflective film 3a of the polarizing beam splitter 3 as such has been changed by a phase shift operation of the quarter-wave plate 5 into the linearly polarized light in the P direction. Therefore, the return light is not reflected by the reflective film 3a but passes through the reflective film 3a as control laser light Lc.

Reference numeral 10 denotes a sensor lens, which the control laser light Lc having passed through the reflective film 3a of the polarizing beam splitter 3 enters and which has a function of adding astigmatism to the control laser light Lc to be applied to a light receiving portion provided in a photodetector 11 called PDIC. The photodetector 11 includes a known quad sensor or the like, and is configured so as to perform signal generation operation associated with operation of reading a signal recorded in the signal recording layer of the optical disc D by operation of applying the main beam, a focus-error signal generation operation for performing focusing control operation by an astigmatism method, and a tracking-error signal generation operation for performing a tracking control operation by operation of applying the two sub-beams. Since such control operation for generating the above various signals are known, description is omitted.

The optical pickup apparatus according to an embodiment of the present invention is configured as mentioned above, and in such a configuration, the objective lens 9 is fixed to a lens holding frame (not shown), which is supported by four or six support wires on a base of the optical pickup apparatus so as to be capable of performing displacement operation in a perpendicular direction to the signal face of the optical disc D, i.e., a focusing direction, and in a radial direction of the optical disc D, i.e., a tracking direction.

Reference numeral 12 is a focusing coil, which is disposed at the lens holding frame to which the objective lens 9 is fixed and which has a function of displacing the objective lens 9 in the focusing direction by operating in concert with a magnet fixed to the base. Reference numeral 13 is a tracking coil, which is disposed at the lens holding frame to which the objective lens 9 is fixed and which has a function of displacing the objective lens 9 in the tracking direction by operating in concert with the magnet fixed to the base.

A configuration of the optical pickup apparatus including the above-mentioned focusing coil 12 and the tracking coil 13, and the focusing control operation and the tracking control operation by performing operation of supplying a driving signal to each coil, are known, and therefore, description thereof is omitted.

Reference numeral 14 denotes an RF signal generation circuit for generating an RF signal, which is a signal obtained from a sensor for receiving the main beam making up the photodetector 11 in accordance with the operation of reading the signal recorded in the signal recording layer L of the optical disc D, reference numeral 15 denotes a focus-error signal generation circuit for generating a focus-error signal, which is a signal obtained from the sensor for receiving the main beam in accordance with a focusing operation of the laser light, and reference numeral 16 denotes a tracking-error signal generation circuit for generating a tracking-error signal, which is a signal obtained from the sensor receiving the sub-beams in accordance with a tracking operation of the laser light.

Reference numeral 17 denotes a laser-output detection circuit, to which a signal obtained from the monitor photodetector 4 is inputted and which is configured to output a signal corresponding to a level of such an inputted signal as a monitor signal of the laser output.

Reference numeral 18 denotes a pickup control circuit for performing various control operation of the optical pickup apparatus on the basis of signals from the RF signal generation circuit 14, the focus-error signal generation circuit 15, the tracking-error signal generation circuit 16, the laser output detection circuit 17 and the like. Reference numeral 19 is a focusing-coil driving circuit, to which a focus control signal, outputted from the pickup control circuit 18 on the basis of the focus error signal generated to be inputted from the focus-error signal generation circuit 15, is inputted, and which is configured to supply a driving signal to the focusing coil 12. Reference numeral 20 is a tracking-coil driving circuit to which a tracking control signal, outputted from the pickup control circuit 18 on the basis of the tracking error signal generated to be inputted from the tracking-error signal generation circuit 16, is inputted, and which is configured to supply a driving signal to the tracking coil 13.

Reference numeral 21 denotes a laser-diode driving circuit, which supplies a driving signal to the laser diode 1 and which is configured to adjust the laser output by a control signal outputted from the pickup control circuit 18 on the basis of a monitor signal obtained from the laser output detection circuit 17. Reference numeral 22 is a motor driving circuit for aberration correction, which corrects spherical aberration by moving the collimating lens 6 in the optical axis direction by supplying a driving signal to the aberration correction motor 7 and which is configured to be controlled by the pickup control circuit 18.

Reference numeral 23 denotes a spherical aberration amount detection circuit, which is disposed for detecting a spherical aberration amount by detecting a level or a jitter value of an RF signal obtained from the RF signal generation circuit 14, and a method for measuring the spherical aberration amount by detecting a level of the RF signal includes the one described in the above-mentioned Japanese Patent Laid-Open Publication No. 2004-14042.

In an embodiment of the present invention, if a stepping motor is used as the aberration correction motor 7 which is disposed to move the collimating lens 6 in the optical axis direction, a rotation amount can be accurately set by the number of pulses supplied as a driving signal, and such an advantage can be obtained that a movement position of the collimating lens 6 can be minutely controlled.

The optical pickup apparatus according to an embodiment of the present invention is configured as mentioned above, and hereinafter, operation of an optical pickup apparatus having such a configuration will be described.

When an operation of reproducing a signal recorded in the signal recording layer L included in the optical disc D is carried out, the driving control signal is supplied from the pickup control circuit 18 to each circuit making up the optical pickup apparatus. A driving signal for obtaining the laser output, which is set in advance for performing the reproduction operation accurately, is supplied from the laser-diode driving circuit 21 to the laser diode 1, so that the blue-violet laser light with a desired output is applied from the laser diode 1.

The laser light emitted from the laser diode 1 enters the diffraction grating 2, to be divided into the main beam and the sub-beams by the diffraction grating portion 2a included in the diffraction grating 2, and converted into the linearly polarized light in the S direction by the half-wave plate 2b. The laser light having passed through the diffraction grating 2 enters the polarizing beam splitter 3, so that most of the laser light is reflected by the control film 3a included in the polarizing beam splitter 3, while a part of the laser light passes therethrough.

The laser light having passed through the control film 3a is applied to the monitor photodetector 4, and a signal according to a level of such applied laser light is outputted as a monitor signal from the laser-output detection circuit 17, to be inputted to the pickup control circuit 18. If such a monitor signal is inputted, a control signal on the basis of the level of the monitor signal is supplied from the pickup control circuit 18 to the laser-diode driving circuit 21. Therefore, if the configuration is made such that the level of the driving signal supplied from the pickup control circuit 18 to the laser-diode driving circuit 21 is controlled so as to become a predetermined value, the output of the laser light emitted from the laser diode 1 can automatically be controlled so as to become a desired level. Such an operation is called an automatic output control operation of laser, as known, and description thereof is omitted.

The laser light reflected by the control film 3a included in the polarizing beam splitter 3 enters the quarter-wave plate 5 to be converted from the linearly polarized light to circular polarizing light, and then, enters the collimating lens 6. The laser light incident onto the collimating lens 6 is converted into parallel light, to enter the raising mirror 8.

The laser light incident on the raising mirror 8 is reflected by the raising mirror 8, to enter the objective lens 9. Since the laser light enters the objective lens 9 through the above-mentioned optical path, a focusing operation is performed by the objective lens 9.

The focusing operation of the laser light onto the signal recording layer L by the objective lens 9 is performed by the focus control operation, but since an operation is well known of generating a focus error signal, which is used for performing the focus control operation by the astigmatism method using the quad sensor included in the photodetector 11, description thereof is omitted.

A displacement operation of the objective lens 9 for carrying out the above-mentioned focus control operation is performed by supplying a driving signal from the focusing-coil driving circuit 19 to the focusing coil 12, but if the focusing operation onto the signal recording layer L is performed, the laser light reflected from the signal recording layer L enters the objective lens 9 as return light from a face on the optical disc D side.

The return light incident on the objective lens 9 enters the control film 3a included in the polarizing beam splitter 3 through the raising mirror 8, the collimating lens 6, and the quarter-wave plate 5. Since the return light incident on the control film 3a has been converted by the quarter-wave plate 5 into the linearly polarized light in the P direction, it is not reflected by the control film 3a but all the light passes therethrough as the control laser light Lc.

The control laser light Lc, which is the return light having passed through the control film 3a, enters the sensor lens 10, to be added with astigmatism by the sensor lens 10 and applied to the photodetector 11. As the result of applying the control laser light Lc to the photodetector 11, a detection signal on the basis of positions of irradiation spots and shape changes of the main beam and the sub-beams can be obtained from the quad sensor and the like included in the photodetector 11.

In such a state, the focus error signal generated by the focus-error signal generation circuit 15 and the tracking error signal generated by the tracking-error signal generation circuit 16 on the basis of the detection signal obtained from the photodetector 11 are inputted to the pickup control circuit 18. If such a focus error signal and tracking error signal are inputted to the pickup control circuit 18, a control signal on the basis of each error signal is outputted to the focusing-coil driving circuit 19 and the tracking-coil driving circuit 20.

As a result, since a control signal is supplied to the focusing coil 12 from the focusing-coil driving circuit 19, the displacement operation of the objective lens 9 in the focusing direction is performed by the focusing coil 12, and the focusing control operation for focusing the laser light onto the signal recording layer L can be performed. Also, since a control signal is supplied to the tracking coil 13 from the tracking-coil driving circuit 20, the displacement operation of the objective lens 9 in the tracking direction is performed by the tracking coil 13, and the tracking control operation of allowing the laser light to track a signal track provided in the signal recording layer L can be performed.

Since the focusing control operation and the tracking control operation in the optical pickup apparatus are carried out as mentioned above, the operation of reading the signal recorded in the signal recording layer L of the optical disc D can be performed. A reproduced signal obtained by such reading operation can be obtained as information data by decoding an RF signal generated from the RF signal generation circuit 14, as known.

The operation of reading the signal recorded in the signal recording layer L is performed as mentioned above, and in a state where such a reading operation is performed, the collimating lens 6 provided as aberration correcting means is so configured as to be displaced to an operating position at which spherical aberration for the signal recording layer L is minimized by a rotating operation by a driving signal supplied to the aberration correction motor 7 from the aberration correction motor driving circuit 22.

A setting operation of such an operating position is performed by the spherical aberration amount detection circuit 23, and it is only required to set the position such that a jitter value included in the reproduced signal becomes an optimal value or a level of the RF signal becomes the maximum, for example. That is, the jitter value or the level of the RF signal is measured every time the collimating lens 6 is moved in position by a rotation driving operation of the aberration correction motor 7 in an arrow A or B direction, which is the optical axis direction, by a predetermined amount, and the position at which the jitter value is the minimum or the RF signal level is the maximum is to be set as an operating position of the collimating lens.

By performing the above-mentioned setting operation, there can be minimized the spherical aberration occurring in the spot of the laser light which is incident on the objective lens 9 to be applied to the signal recording layer L of the optical disc D. That is, by performing the control operation of displacing the collimating lens 6 to the operating position as mentioned above, the operation of reproducing the signal recorded in the signal recording layer L included in the optical disc D can be performed with a spot of an optimal shape.

The optical pickup apparatus according to an embodiment of the present invention is configured as above, and hereinafter, the gist of an embodiment of the present invention will be described.

The objective lens 9 included in the optical pickup apparatus according to an embodiment of the present invention is made of inexpensive resin called polymethylmethacrylate or polycarbonate, not of cyclic olefin resin such as the above-mentioned APL5014DP or ZEONEX340R.

That is, the polymethylmethacrylate or polycarbonate resin not only is more inexpensive than the cyclic olefin resin but has such excellent optical characteristics as light resistance, that is, transmittance caused by irradiation of the laser light or the like is decreased in a less extent.

However, such polymethylmethacrylate or polycarbonate resin has a problem that the moisture-absorption characteristics are poor. That is, the objective lens made of the polymethylmethacrylate or polycarbonate resin has such characteristics that not only the refractive index but also the size is changed by moisture absorption.

If the refractive index and the size are changed by moisture absorption in the objective lens 9, spherical aberration occurs with such change. In an embodiment of the present invention, if spherical aberration occurs due to the moisture-absorption characteristics, an amount of the spherical aberration is detected by the spherical aberration amount detection circuit 23, and an aberration correction control signal based on the detected amount is outputted from the pickup control circuit 18 to the aberration correction motor driving circuit 22.

If the aberration correction control signal is inputted to the aberration correction motor driving circuit 22, a driving signal is outputted from the aberration correction motor driving circuit 22 to the aberration correction motor 7. As a result, such a control operation is performed as to rotate the aberration correction motor 7 by the rotation number corresponding to the driving signal and to displace the collimating lens 6 in the arrow A or B direction to be moved to the operating position. The spherical aberration caused by the moisture absorption of the objective lens 9 can be corrected by the operation of moving the collimating lens 6 to the operating position.

[Embodiment 2]

In an embodiment 1 described above, an correction operation of spherical aberration is performed by the movement control operation of the collimating lens 6 in the optical axis direction, and hereinafter, an embodiment 2 illustrated in FIG. 2 will be described.

In this figure, the same constituent elements as those in an embodiment 1 illustrated in FIG. 1 are designated by the same reference numerals and description as to the same operations is omitted.

Reference numeral 24 denotes a liquid-crystal aberration correction element, which the laser light having been converted into parallel light by the collimating lens 6 enters, and includes a liquid crystal pattern for correcting spherical aberration at least. Such a liquid-crystal aberration correction element 24 has a function of correcting spherical aberration by varying the refractive index, and includes two glass substrates arranged in an opposing manner and a liquid crystal molecule oriented, via an alignment film, in between electrodes having electrode patterns on opposing faces of the glass substrates.

The electrode pattern, which is formed on each of the electrodes, is in a shape according to the spherical aberration, for example, in a concentric fashion corresponding to a direction in which the spherical aberration occurs. A configuration may also be made such that an electrode pattern for correcting the spherical aberration is formed on one of the electrodes and an electrode pattern for correcting comatic aberration is formed on the other thereof. By making a configuration as such, not only the spherical aberration but the comatic aberration can also be corrected at the same time. The configuration of the liquid-crystal aberration correction element 24 can be changed in various ways, and since the control operation thereof is known, description is omitted.

Reference numeral 25 denotes a liquid-crystal driving circuit for aberration correction, which outputs a driving signal for performing aberration correction operation by the liquid-crystal aberration correction element 24 on the basis of a control signal outputted from the pickup control circuit 18. The aberration correction operation of the liquid-crystal aberration correction element 24 is performed by carrying out control operation for an aberration correction pattern provided on the liquid-crystal aberration correction element 24, as known. The control operation for correcting aberration is so performed as to reduce the spherical aberration amount detected by the spherical aberration amount detection circuit 23.

Since the operation of correcting spherical aberration can be performed by the liquid-crystal aberration correction element 24 as such, even if spherical aberration occurs due to the moisture-absorption characteristics when the objective lens 9 is made of the polymethylmethacrylate or polycarbonate resin, signal reading operation and signal recording operation can be performed without any problem.

[Embodiment 3]

The objective lens 9 included in the optical pickup apparatus in embodiments 1 and 2 described above is an objective lens configured by using a resin material with a refractive index of 1.59 or more.

===Polycarbonate Resin===

<Characteristics of Objective Lens>

Figure 3A:
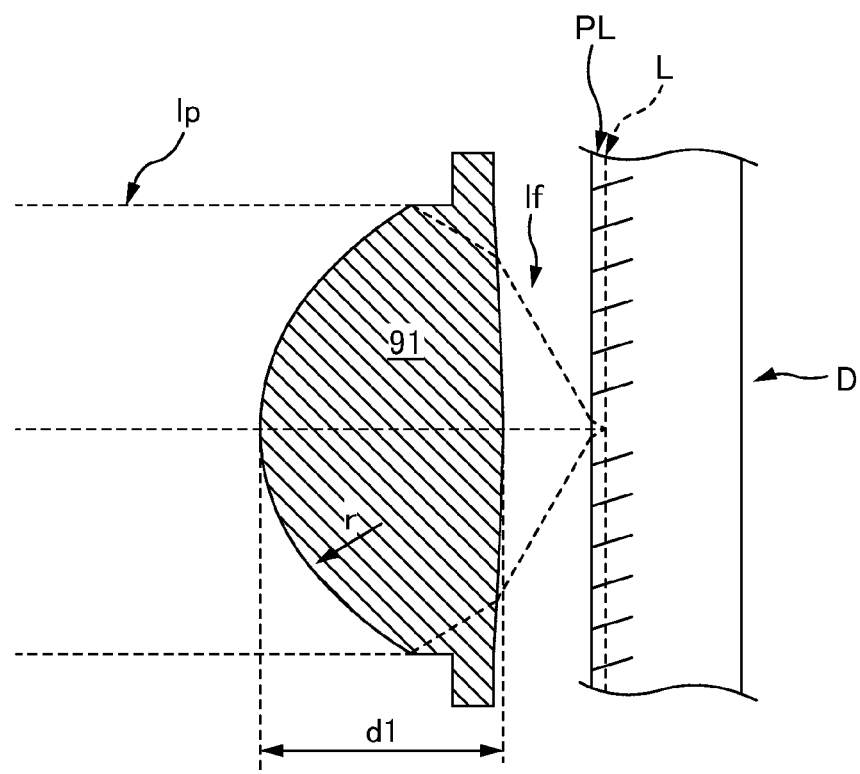
FIG. 3A is a sectional view of an objective lens made of polycarbonate resin.
Figure 3B:
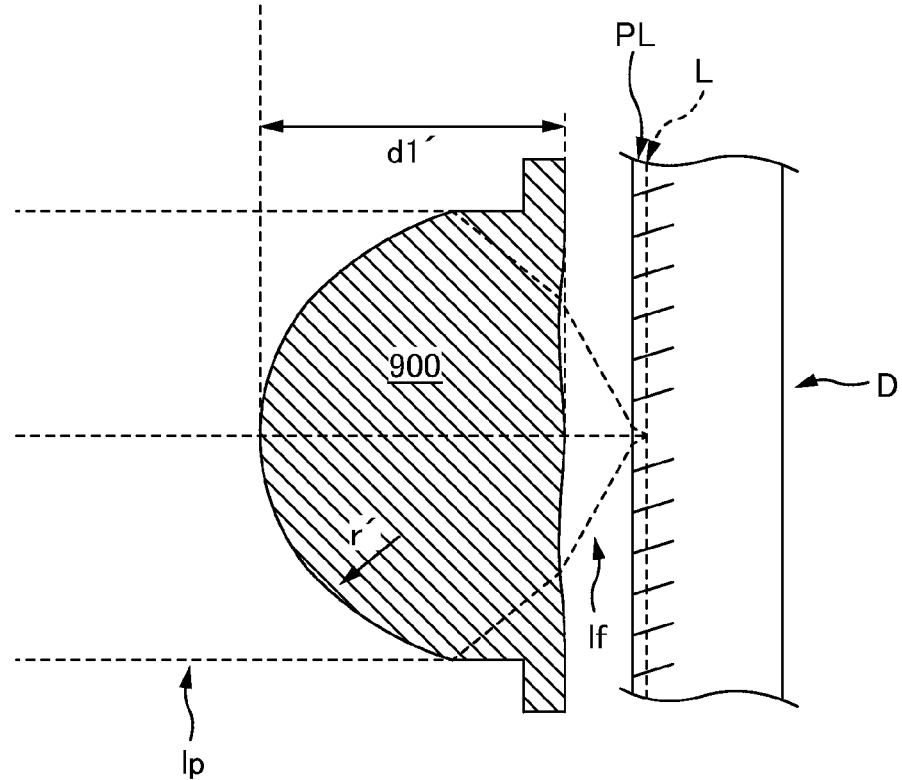
FIG. 3B is a sectional view of an objective lens made of cyclic olefin resin.

Referring to FIG. 3A, a configuration example of an objective lens 91 will be described. FIG. 3A is a sectional view of the objective lens 91 made of polycarbonate resin. On the other hand, FIG. 3B is a sectional view of an objective lens 900 made of olefin resin, for comparison purpose.

The objective lens 91 is configured by using polycarbonate resin such as Panlite SP ("Panlite" is a registered trademark) by Teijin Chemicals Ltd., for example. In an embodiment of the present invention, a refractive index n405 of the objective lens 91 for the blue-violet light having a wavelength of 405 nm is 1.622 (design temperature is 35° C.). That is, the refractive index n405 is 1.59 or more.

The refraction index of a transparent resin material varies with a wavelength of light in general. The "polycarbonate resin material with a refractive index of 1.59 or more" in an embodiment of the present invention includes not only the polycarbonate resin material with a refractive index of 1.59 or more for light with a wide range of a wavelength from 400 nm (blue-violet) to 800 nm (near infrared), for example, but also the polycarbonate resin material with a refractive index of 1.59 or more for light only with a wavelength of substantially 589 nm (light of D line) or shorter, for example.

In the case of Panlite (registered trademark), for example, description will be made based on a graph illustrating wavelength dependence of the refractive index exemplified in FIG. 4 ("Research and development, Panlite SP" [online], Teijin Chemicals Ltd. [searched on Oct. 30, 2009] the Internet <URL: http://www.teijin.co.jp/rd/rd1_10.html>) In the case of Panlite SP-1516 exemplified by a solid curved line in FIG. 4, the refractive index is 1.59 or more for light in a wide range from the blue-violet light of a wavelength of 400 nm to the near infrared light of a wavelength 800 nm (ambient temperature is 25° C.). According to FIG. 4, the refractive index n405 for the blue-violet light with a wavelength of 405 nm is substantially 1.66 and the refractive index to the D-line light with a wavelength of 589 nm is 1.61 (in all the above cases, the ambient temperature is 25° C.)

Figure 4:
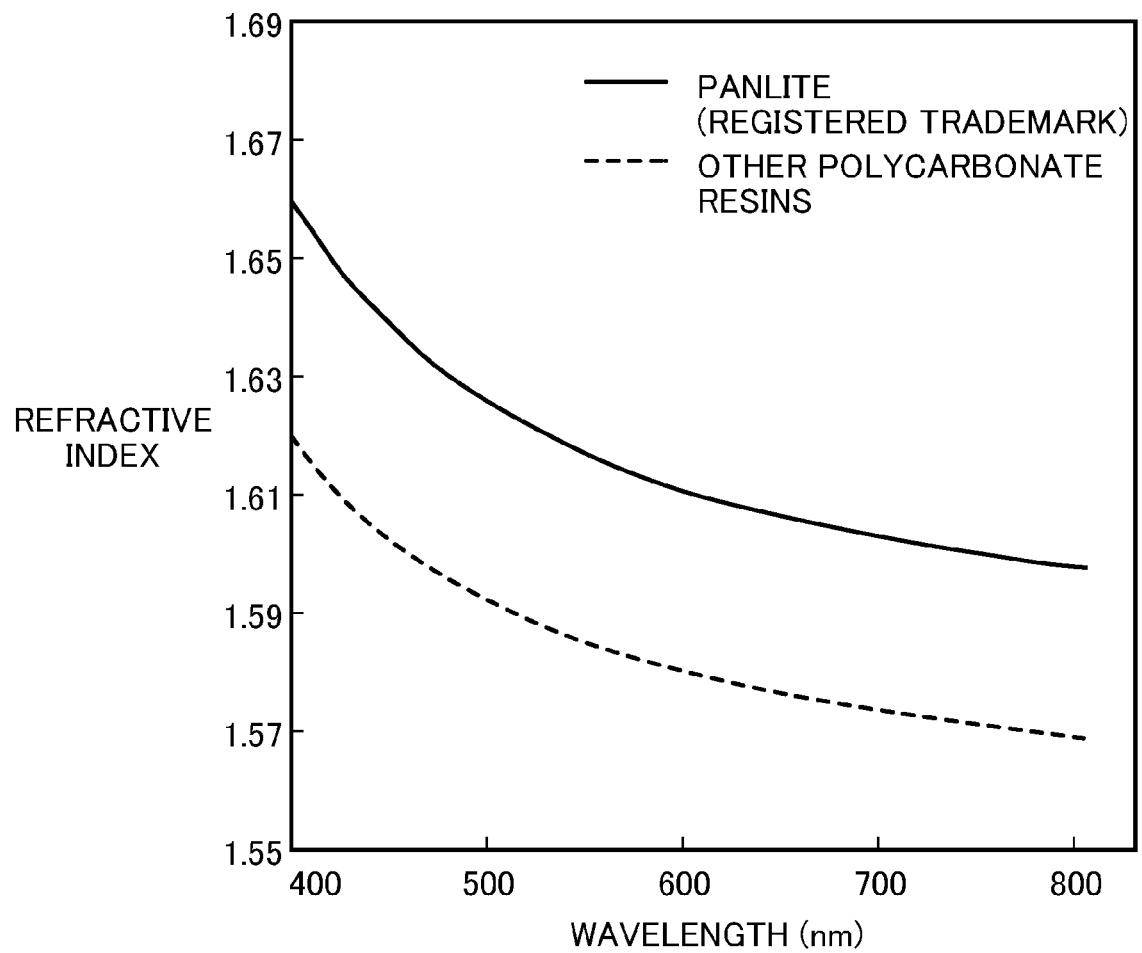
FIG. 4 is a graph illustrating wavelength dependency of a refractive index of polycarbonate resin.

In the case of the polycarbonate resin other than Panlite (registered trademark), for example, according to a dotted curved line in FIG. 4, the refractive index for light with a wavelength shorter than the D-line light with a wavelength of 589 nm is 1.59 or more (ambient temperature is 25° C.). According to FIG. 4, the refractive index n405 for the blue-violet light with a wavelength of 405 nm is substantially 1.61, and the refractive index for the D-line light with a wavelength of 589 nm is approximately 1.59 (in all the above cases, the ambient temperature is 25° C.)

The polycarbonate resin, which is a material of the objective lens 91, is also used as a material of a protection layer PL of the optical disc D. Light resistance (that is, such a degree as to suppress decrease in transmittance caused by irradiation of the laser light) of the objective lens 91, which is made of the same polycarbonate resin as that of which the protection layer PL of the optical disc D is made, is at least equal to that of the optical disc D, and thus, it is sufficiently high.

Table 1 illustrates an example of design values of the objective lens 91. In the design values, particularly a central thickness d1 is 1.5 mm (See FIG. 3A), and a focal length f with respect to the signal recording layer L of the optical disc D is 1.4 mm. That is, a ratio d1/f of the central thickness to the focal length is 1.071, and this value is less than 1.1. Table 2 illustrates an example of design values relating to a shape of the objective lens 91. That is, these design values are radius of curvature and aspheric coefficients representing the shape of the objective lens 91. These radius of curvature and aspheric coefficients are set on both sides, which are the collimating lens 6 (See FIG. 1) side or the liquid-crystal aberration correction element 24 (See FIG. 2) side and the optical disc D side, respectively, in the objective lens 91.

TABLE 1

| Item | Design value |
|---|---|
| Design wavelength (nm) | 405 |
| Focal length on optical disc side (mm) | 1.4 |
| NA (numerical aperture) | 0.85 |
| Operating distance (mm) | 0.52 |
| Central thickness (mm) | 1.5 |
| Object-to-image distance (mm) | ∞ |
| Design temperature (° C.) | 35 |
| n405 (refractive index) | 1.622 |

TABLE 2

| | Collimating lens side or liquid-crystal aberration correction element side | Optical disc side |
|---|---|---|
| <Radius of curvature> | | |
| r (mm) | 0.978 | −3.234 |
| <Aspheric coefficient> | | |
| ∞ | −0.55 | −510.0 |
| $r^4$ | 0.040898 | −0.026907 |
| $r^6$ | −0.047904 | −0.02267 |
| $r^8$ | 0.044287 | −0.001026 |
| $r^{10}$ | −0.015244 | 0.017257 |
| $r^{12}$ | −0.010651 | 0.013667 |
| $R^{14}$ | 0.0008912 | −0.019231 |

The shape of the objective lens 91 exemplified in FIG. 3A reflects design values exemplified in Table 2. On the basis of a result of optical calculation using the design values exemplified in Tables 1 and 2, an optical path lf on the optical disc D side and a parallel optical path lp on the collimating lens 6 (See FIG. 1) side or the liquid-crystal aberration correction element 24 (See FIG. 2) side with respect to the objective lens 91 are exemplified by a dotted line in the figure. Though not exemplified in Table 1, a thickness of the protection layer PL of the optical disc D is 0.0875 mm, and a spherical aberration correction method is aspheric, in the optical calculation.

On the other hand, for comparison purpose with the objective lens 91, the objective lens 900 configured by using olefin resin such as ZEONEX340R ("ZEONEX" is a registered trademark) by Zeon Corporation, for example, is exemplified in FIG. 3B. Since the refractive index of the objective lens 91 made of polycarbonate resin (nd, n405, for example) is higher than the refractive index of the objective lens 900 made of olefin resin (nd, n405, for example), a radius of curvature r of the objective lens 91 (FIG. 3A) is greater than a radius of curvature r' of the objective lens 900 (FIG. 3B) (that is, the curvature is flatter), and thus, the central thickness d1 of the objective lens 91 (FIG. 3A) can be more reduced than the central thickness d1' of the objective lens 900 (FIG. 3B).

Figure 5:
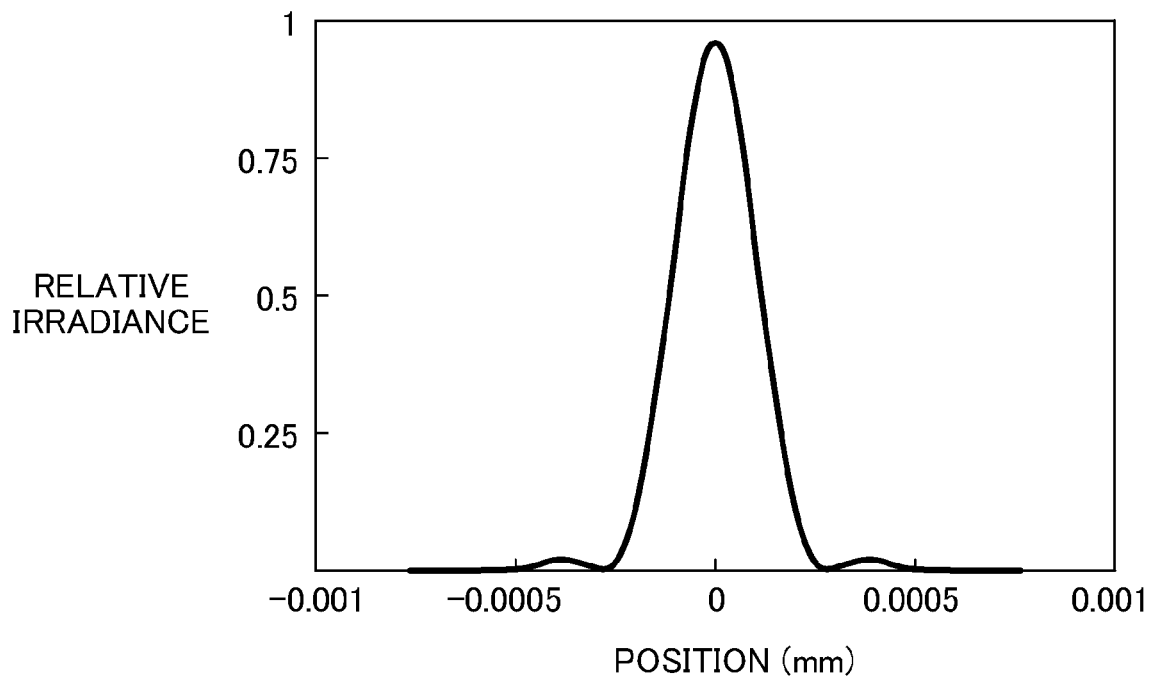
FIG. 5 is a graph illustrating intensity distribution of a laser spot formed on an optical disc by an objective lens made of polycarbonate resin.
Figure 6:
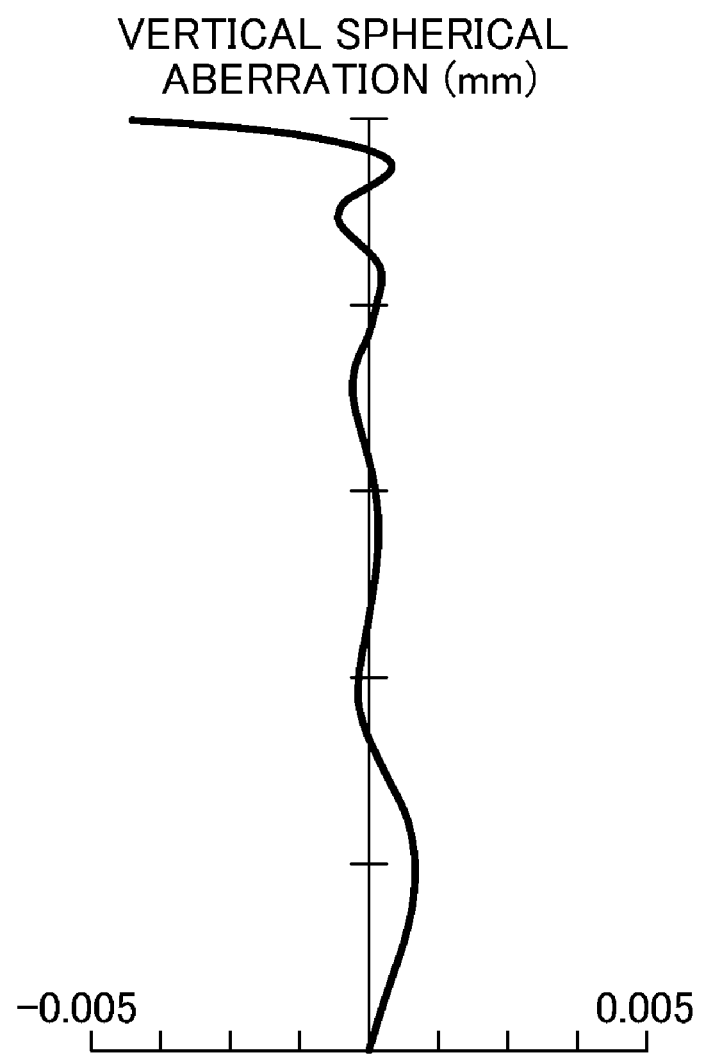
FIG. 6 is a graph illustrating vertical spherical aberration of an objective lens made of polycarbonate resin.

There are shown in FIGS. 5 and 6 characteristics of the objective lens 91 according to an embodiment of the present invention on the basis of a result of performing optical calculation using the design values exemplified in Tables 1 and 2. FIG. 5 is a graph illustrating intensity distribution of a laser spot formed on the optical disc D by the objective lens 91 made of polycarbonate resin, and FIG. 6 is a graph illustrating vertical spherical aberration of the objective lens 91 made of polycarbonate resin.

As exemplified in FIG. 5, a full-width at half-maximum (FWHM) of the intensity distribution of the spot formed on a disc face of the optical disc D by the objective lens 91 according to an embodiment of the present invention is substantially 0.3 μm (that is, substantially 0.0003 mm), and this value shows favorable characteristics. Also, as exemplified in FIG. 6, the vertical spherical aberration of the objective lens 91 according to an embodiment of the present invention also shows favorable characteristics.

Since the objective lens 91 is made of polycarbonate resin having the above characteristics, for example, the same polycarbonate resin as that in the protection layer PL of the optical disc D conforming to the Blu-ray standard, the light resistance thereof to the blue-violet laser light (that is, such a degree as to suppress decrease in transmittance caused by irradiation of the laser light) is high. Also, by using a material with a high refractive index, a radius of curvature of a high NA portion (portion with a high numerical aperture) in the objective lens 91 can be increased (that is, the curvature can be flattened), as exemplified in FIG. 3A, and thus, productivity of the objective lens 91 is increased. As a result, the objective lens 91 becomes inexpensive by such an amount. Moreover, by using a material with a high refractive index, the thickness of the objective lens 91 can be reduced, as exemplified in FIG. 3A, and thus, occurrence of astigmatism during tilting operation of the objective lens 91 can be suppressed. <<<Correction of Spherical Aberration>>>

On the other hand, since the resin material such as polycarbonate has higher moisture-absorption characteristics as compared with that of a glass material, spherical aberration occurs in the objective lens 91 due to the high moisture-absorption characteristics thereof.

Thus, in an embodiment of the present invention, by moving the aberration correction element interposed in the optical path for the laser light between the laser diode 1 and the optical disc D in the optical pickup apparatus, the spherical aberration caused by the moisture-absorption characteristics of the resin material is to be corrected.

<Collimating Lens>

The aberration correction element is the collimating lens 6 according to an embodiment 1 described above, for example, and is controlled so as to be moved in the optical axis direction of the laser light so that spherical aberration is corrected according to the spherical aberration caused by the moisture-absorption characteristics of the resin material.

Specifically, assuming that the objective lens 9 in FIG. 1 is the objective lens 91, when spherical aberration occurs, an amount of the spherical aberration is detected by the spherical aberration amount detection circuit 23, and an aberration correction control signal on the basis of the detected amount is outputted from the pickup control circuit 18 to the aberration correction motor driving circuit 22. When the aberration correction control signal is inputted to the aberration correction motor driving circuit 22, a driving signal is outputted from the aberration correction motor driving circuit 22 to the aberration correction motor 7. The aberration correction motor 7 is rotated by the rotation number corresponding to the driving signal, the collimating lens 6 is displaced by a displacement amount corresponding to the rotation number in the arrow A or B direction (optical axis direction) in FIG. 1. As a result, spherical aberration caused by the moisture-absorption characteristics of the objective lens 91 is corrected.

<Liquid-crystal Aberration Correction Element>

Alternatively, the aberration correction element is the liquid-crystal aberration correction element 24 according to an embodiment 2 described above, for example, and is controlled so as to correct spherical aberration according to the spherical aberration caused by the moisture-absorption characteristics of the resin material.

Figure 2:
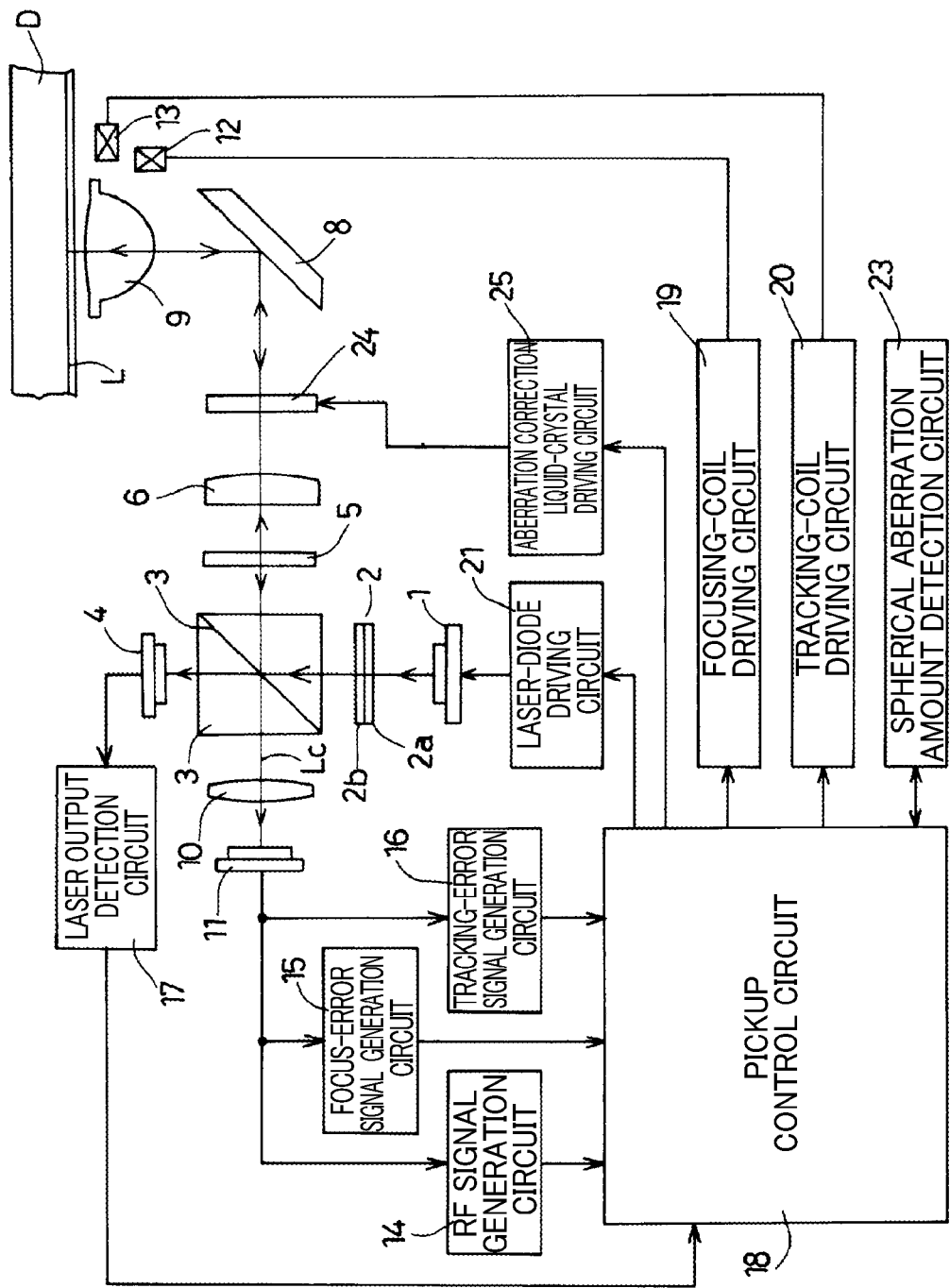
FIG. 2 is a schematic diagram illustrating an embodiment 2 of an optical pickup apparatus according to the present invention.

Specifically, assuming that the objective lens 9 in FIG. 2 is the objective lens 91, when spherical aberration occurs, an amount of the spherical aberration is detected by the spherical aberration amount detection circuit 23, and an aberration correction control signal on the basis of the detected amount is outputted from the pickup control circuit 18 to the aberration correction liquid-crystal driving circuit 25. When the aberration correction control signal is inputted to the aberration correction liquid-crystal driving circuit 25, a voltage on the basis of the aberration correction control signal is applied to the electrode of the liquid-crystal aberration correction element 24 from the aberration correction liquid-crystal driving circuit 25, so that the spherical aberration caused by the moisture-absorption characteristics of the objective lens 91 is corrected. Also, in the case of the liquid-crystal aberration correction element 24, not only spherical aberration but also comatic aberration can be corrected.

From the above, according to the objective lens 91 of an embodiment of the present invention, while occurrence of spherical aberration is suppressed, light resistance to the blue-violet laser light is improved, the radius of curvature of the high NA portion (portion with a high numerical aperture) can be increased (that is, the curvature can be flattened), and the thickness can be reduced.

<<<Super-resolution Technique>>>

The numerical aperture of the objective lens 91 for the blue-violet light is 0.85 (See Table 1), but this is not limitative, and an objective lens with a numerical aperture of 0.4 to 0.77, for example, may be applied. In the case of an objective lens with a numerical aperture of 0.4 to 0.77, a light amount of laser light converged thereby is reduced, but its spot diameter is substantially the same as compared with that in the case of the objective lens 91 with a numerical aperture of 0.85.

===Polyester Resin===

Other resin materials with a refractive index of 1.59 or more, as mentioned above, include polyester resin such as OKP4, OKP4HT and the like ("OKP" is a registered trademark) by Osaka Gas Chemicals Co., Ltd., for example.

The refractive index nd of the OKP4 is 1.61 and the refractive index nd of the OKP4HT is 1.63 for the light of the D line with a wavelength of 589 nm (in the above case, the ambient temperature is 20° C.). Here, as mentioned above, the refractive index of a transparent resin material varies with a wavelength of light in general. More specifically, the shorter the wavelength of the light is, the higher the refractive index of the transparent resin material becomes. Thus, the refractive index of OKP4 and OKP4HT for the light with a wavelength of at least 589 nm or less is 1.6 or more. In reality, the refractive index n405 of the OKP4 for the light with a wavelength of 405 nm is 1.64, and the refractive index n405 of the OKP4HT is 1.66.

According to the objective lens made of such polyester resin, there is improved light resistance (that is, such a degree as to suppress decrease in transmittance or the like caused by irradiation of the laser light) for the blue-violet laser light conforming to the Blu-ray standard, for example. Also, by using such a material with a high refractive index, a radius of curvature of the high NA portion (portion with a high numerical aperture) in the objective lens can be increased (that is, the curvature can be flattened), and thus, productivity of the objective lens is increased. As a result, the objective lens is made inexpensive by such an amount. Moreover, by using the material with a high refractive index, the objective lens can be reduced in thickness, and occurrence of astigmatism during a tilting operation of the objective lens can be suppressed.

However, since the polyester resin material also has higher moisture-absorption characteristics than that of the glass material, spherical aberration occurs due to the high moisture-absorption characteristics in the objective lens. Similarly to the case of the objective lens 91 made of polycarbonate resin as mentioned above, by operating an aberration correction element (such as the collimating lens 6 in an embodiment 1 or the liquid-crystal aberration correction element 24 in an embodiment 2 or the like) interposed in the optical path of the laser light between the laser diode 1 and the optical disc D in the optical pickup apparatus, the spherical aberration caused by the moisture-absorption characteristics of the resin material is to be corrected.

===Resin with Refractive Index of 1.59 or More===

The above-mentioned objective lens is mainly applied with blue-violet light and configured by using polycarbonate resin and polyester resin as a material.

However, this is not limitative, it is required at least that the objective lens is arranged in the optical path of the laser light between the laser diode and the optical disc D so that the laser light from the laser diode converges to the signal recording layer L through the protection layer PL of the optical disc D, and is configured by using a resin material with a refractive index of 1.59 or more, and spherical aberration caused by moisture-absorption characteristics of the resin material is corrected by operating the aberration correction element interposed in the optical path of the laser light between the laser diode and the objective lens. According to this objective lens, while occurrence of spherical aberration is suppressed, its curvature can be flattened and its thickness can be reduced.

In the above-mentioned objective lens, the aberration correction element is the collimating lens 6, which may be configured to be moved in the optical axis direction of the laser light so as to correct spherical aberration according to the spherical aberration caused by the moisture-absorption characteristics of the resin material. According to this objective lens, occurrence of spherical aberration can be effectively suppressed.

In the above-mentioned objective lens, the aberration correction element is the liquid-crystal aberration correction element 24, which may be configured to be controlled so as to correct spherical aberration according to the spherical aberration caused by the moisture-absorption characteristics of the resin material. According to this objective lens, occurrence of spherical aberration can be effectively suppressed, and comatic aberration can also be also suppressed.

In the above-mentioned objective lens, the laser diode may be the above-mentioned laser diode 1 for emitting the blue-violet laser light. Since the shorter the light wavelength is, the higher the refractive index of the material becomes in ordinary cases, the refractive index of the objective lens becomes higher in this objective lens. Therefore, the curvature of the objective lens can be flattened and the thickness thereof can be reduced.

In the above-mentioned objective lens, the ratio of the central thickness relative to the focal length with respect to the signal recording layer L of the optical disc D is preferably less than 1.1. By this objective lens, the thickness can be further reduced.

Also, as the above-mentioned resin material with a high refractive index, thiourethane resin, episulfide resin and the like may be used. The thiourethane resin includes MR-6 (trademark), MR-7 (trademark), MR-8 (trademark) by Mitsui Chemicals Inc., and the like, for example, and the episulfide resin includes MR-174 (trademark) by Mitsui Chemicals Inc., for example. The refractive index ne of these resin materials for the E-line light with a wavelength of 546 nm is 1.6 to 1.74. Here, as mentioned above, since the shorter the light wavelength is, the higher the refractive index of the transparent resin material becomes in ordinary cases, the refractive index n405 of these resin is 1.6 or more.

The above embodiments of the present invention are simply for facilitating the understanding of the present invention and are not in anyway to be construed as limiting the present invention. The present invention may variously be changed or altered without departing from its spirit and encompass equivalents thereof.

What is claimed is:

1. An optical pickup apparatus comprising:
a laser diode;
an objective lens made of synthetic resin material having a refractive index greater than or equal to 1.61 with respect to laser light having a wavelength of 405 nm, the objective lens arranged in an optical path of laser light between the laser diode and an optical disc so that the laser light from the laser diode is focused onto a signal recording layer through a protection layer of the optical disc; and
a collimating lens interposed in an optical path of the laser light between the laser diode and the objective lens, the collimating lens configured to be operated so as to correct spherical aberration caused by moisture-absorption characteristics of the objective lens,
the spherical aberration being corrected by moving the collimating lens in an optical axis direction of the laser light to a position selected from a position at which a jitter value contained in a reproduced signal is minimized and a position at which an RF signal level is maximized.

2. The optical pickup apparatus according to claim 1, wherein
a material of the objective lens includes polymethylmethacrylate.

3. The optical pickup apparatus according to claim 1, wherein
a material of the objective lens includes polycarbonate resin.

4. The optical pickup apparatus according to claim 1, wherein
the laser diode emits blue-violet laser light.

5. The optical pickup apparatus according to claim 1, wherein
a material of the objective lens includes polyester resin.

6. The optical pickup apparatus according to claim 1, wherein
a ratio of a central thickness of the objective lens to a focal length with respect to the optical disc is smaller than 1.1.

7. The optical pickup apparatus according to claim 1, wherein
a numerical aperture of the objective lens is 0.4 to 0.77.

8. An optical pickup apparatus comprising:
a laser diode;
an objective lens made of synthetic resin material having a refractive index greater than or equal to 1.61 with respect to laser light having a wavelength of 405 nm, the objective lens arranged in an optical path of laser light between the laser diode and an optical disc so that the laser light from the laser diode is focused onto a signal recording layer through a protection layer of the optical disc; and
a liquid-crystal aberration correction element interposed in an optical path of the laser light between the laser diode and the objective lens, the liquid-crystal aberration correction element configured to be operated so as to correct spherical aberration caused by moisture-absorption characteristics of the objective lens,
the liquid-crystal aberration correction element including:
two glass substrates arranged in an opposing manner;
two electrodes having electrode patterns on opposing faces of the glass substrates; and
a liquid crystal material oriented, via an alignment film, in between the electrodes,
one of the electrodes having an electrode pattern configured to correct the spherical aberration formed thereon, the other of the electrodes having an electrode pattern configured to correct chromatic aberration formed thereon.

9. The optical pickup apparatus according to claim 8, wherein
a material of the objective lens includes polymethylmethacrylate.

10. The optical pickup apparatus according to claim 8, wherein
a material of the objective lens includes polycarbonate resin.

11. The optical pickup apparatus according to claim 8, wherein
the laser diode emits blue-violet laser light.

12. The optical pickup apparatus according to claim 8, wherein
a material of the objective lens includes polyester resin.

13. The optical pickup apparatus according to claim 8, wherein
a ratio of a central thickness of the objective lens to a focal length with respect to the optical disc is smaller than 1.1.

14. The optical pickup apparatus according to claim 8, wherein a numerical aperture of the objective lens is 0.4 to 0.77.

* * * * *